June 2, 1931.  H. C. GRANT, JR  1,807,659
DETECTION OF SUSPENDED MATTER IN FLUIDS
Filed Feb. 25, 1928
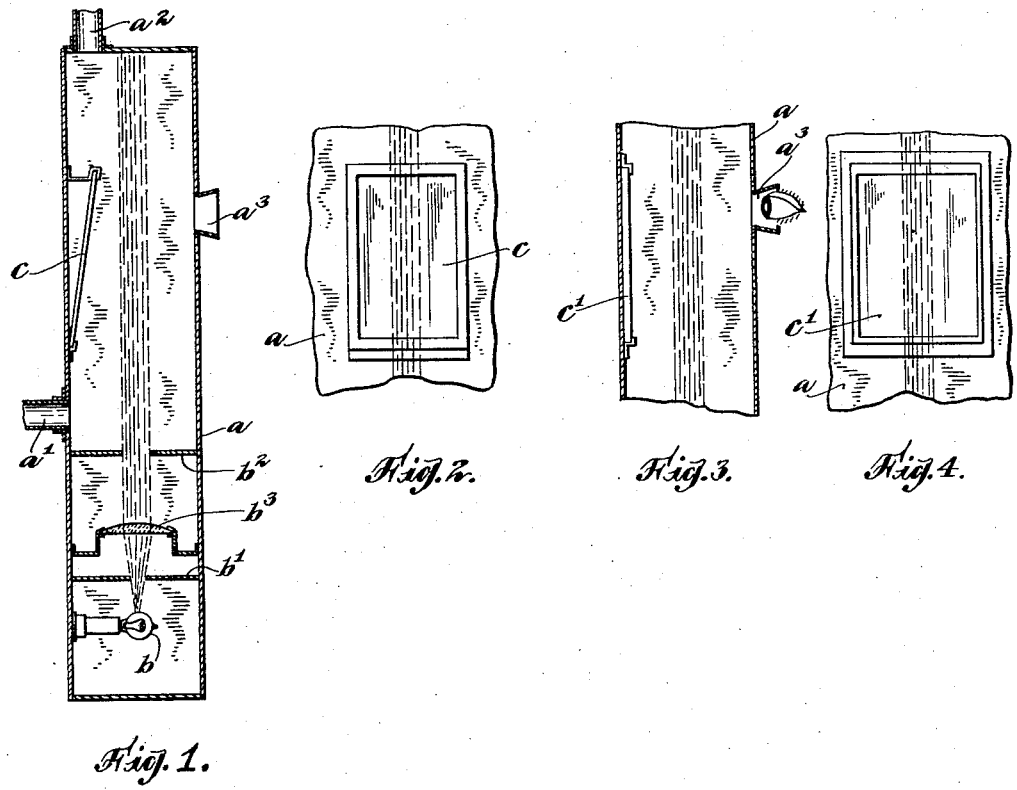
INVENTOR
Harry Campbell Grant Jr
BY
Redding, Greeley, &c.
ATTORNEYS Patented June 2, 1931

1,807,659

UNITED STATES PATENT OFFICE

HARRY CAMPBELL GRANT, JR., OF NEW YORK, N. Y., ASSIGNOR TO WALTER KIDDE & COMPANY, INC., OF NEW YORK, N. Y., A CORPORATION OF NEW YORK

DETECTION OF SUSPENDED MATTER IN FLUIDS

Application filed February 25, 1928. Serial No. 256,864.

In Letters Patent of the United States No. 1,516,608, issued November 25, 1924, to the assignee in the present case there is disclosed a method of and apparatus for the visual detection or observation of smoke particles or other suspended matter in air or other fluids. In accordance with that invention the fluid to be observed, whether air or gas or vapor or some other fluid, is made to flow into the path of a beam of light. When there is no suspended matter in the fluid the beam of light is invisible to the observer, but particles of suspended matter in the fluid are illuminated by the beam of light and may be observed. Long continued use of that invention has demonstrated its utility and at the same time it has shown the desirability of increasing the visibility of the suspended matter in order that the presence of such suspended matter may be more quickly detected and it is the object of the present invention to meet this requirement. In accordance with the invention the desired increase of visibility is attained by superimposing the direct image of the illuminated matter, and a reflected image of the same, one upon another, as presented to the eye of the observer. This is conveniently effected by placing a mirror on the opposite side of the light beam from the eye of the observer, so that to the eye of the observer one image is superimposed upon the other. The visibility is further heightened by the contrast between the illuminated portion of the fluid and the adjacent non-illuminated portion.

The invention will be more fully explained hereinafter with reference to the accompanying drawings in which it is illustrated and in which:

Figure 1 is a view in vertical section of an apparatus which embodies the invention, the mirror being slightly tilted and the position of the light beam being indicated by broken lines.

Figure 2 is a detail view of the mirror in elevation as seen from the right hand in Figure 1.

Figure 3 is a partial view of the apparatus in vertical section, the mirror being shown as parallel with the axis.

Figure 4 is a detail view of the mirror as seen from the right hand in Figure 3.

A convenient form of apparatus in which the invention may be practiced is shown in Figure 1, comprising an elongated casing or chamber $a$, having at $a^1$ an opening for the admission, from the chamber to be protected or other source of supply, of the fluid to be observed, an outlet $a^2$ for such fluid, and a sight opening $a^3$. Except for these openings the chamber is completely enclosed and the openings themselves are suitably arranged so that no stray beams of light may enter the chamber when the apparatus is in use and the eye of the observer is applied to the sight opening. Within the chamber is a source of light $b$, diaphragms $b^1$, $b^2$ and a projecting lens $b^3$ being provided in order that the rays of light may be so projected that sharp definition of the light beam shall be secured.

In proper relation with the sight opening $a^3$ and opposite the same is placed a mirror $c$ which may be tilted slightly so as to reflect the more strongly illuminated portion of the fluid stream, care being taken that the beam of light does not strike the mirror, on which the image is formed only by reflection from the particles of suspended matter in the fluid stream. The mirror is also placed so that it presents to the sight opening no image of the lens $b^3$. It is of course desirable that no part of the sight opening shall be reflected in the mirror, it being understood that in the use of the apparatus the sight opening may be completely closed by the eye of the observer or that it may afford opportunity for observation when the observer's eye is not directly applied to the sight opening.

In the embodiment of the invention shown in Figures 3 and 4, the mirror $c^1$ is shown as parallel with the light beam and the sight opening $a^3$ as closed by the eye of the observer. In the embodiment of the invention illustrated in Figures 1 to 4 visibility of the suspended matter is secured in part by superimposing one image upon the other and in part by contrast of the illuminated portion of the fluid with the non-illuminated adjacent portions. It will be observed that the means for directing the fluid stream through the chamber is such that the fluid stream passes between the sight opening and the mirror, and also that the source of light is so placed that the beam illuminates the stream of fluid between the sight opening and the mirror and does not strike either the mirror or the sight opening, the beam of light preferably having the same general direction as the stream of fluid.

I claim as my invention:

1. The method of detecting suspended matter in a fluid which consists in causing a stream of the fluid to flow into the path of a light beam normally invisible to the observer, observing the illuminated suspended matter from a point out of the path of the light beam, and reflecting from a point also out of the path of the light beam an image of the illuminated suspended matter, the direct image and the reflected image seen together.

2. An apparatus for the detection of suspended matter in fluids which comprises a housing forming an observation chamber and having a sight opening, a mirror supported in the chamber opposite the sight opening, means for directing a fluid stream through the chamber between the sight opening and the mirror, and means for projecting a beam of light through the fluid stream in a line between the sight opening and the mirror and across the line from one to the other.

This specification signed this 17th day of February A. D. 1928.

HARRY CAMPBELL GRANT, Jr.